G. A. WEIDELY.
SPARKER.
APPLICATION FILED JAN. 2, 1908.
928,484.
Patented July 20, 1909.
2 SHEETS—SHEET 2.
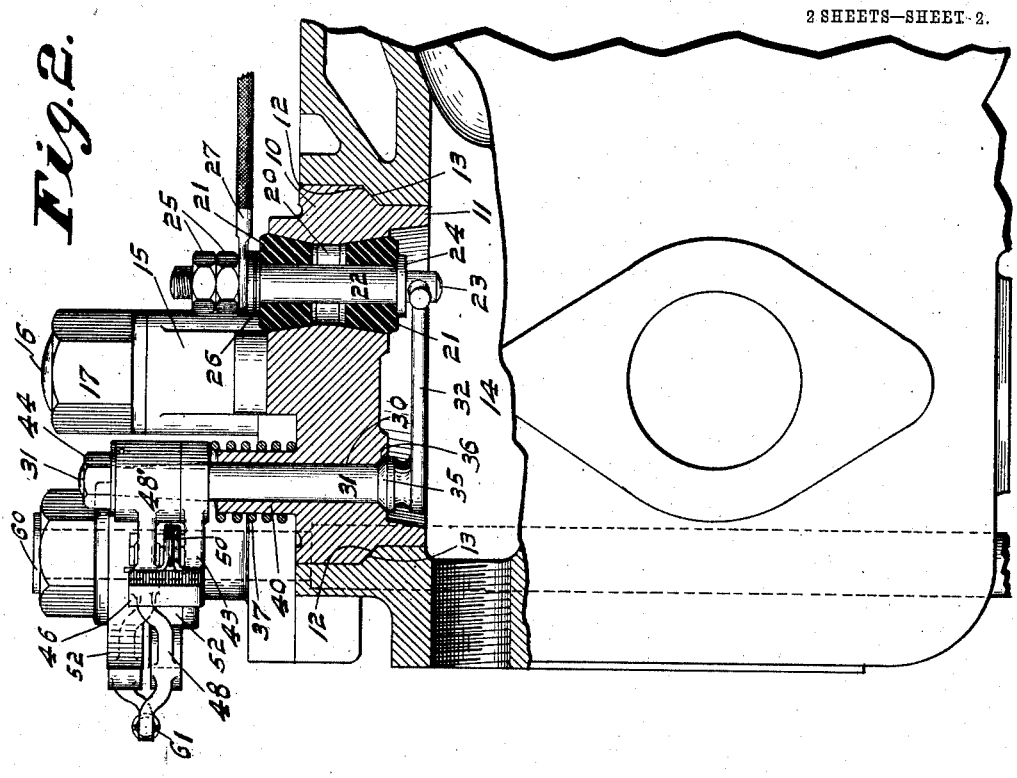
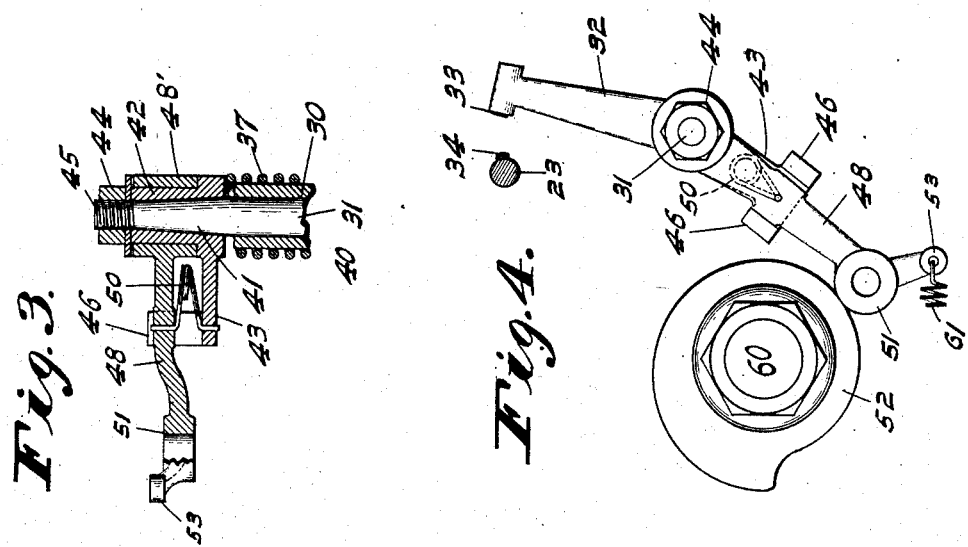
Witnesses
Frank A. Fahle
Thomas W. McMeans
Inventor
George A. Weidely
By
Bradford Hood
Attorneys

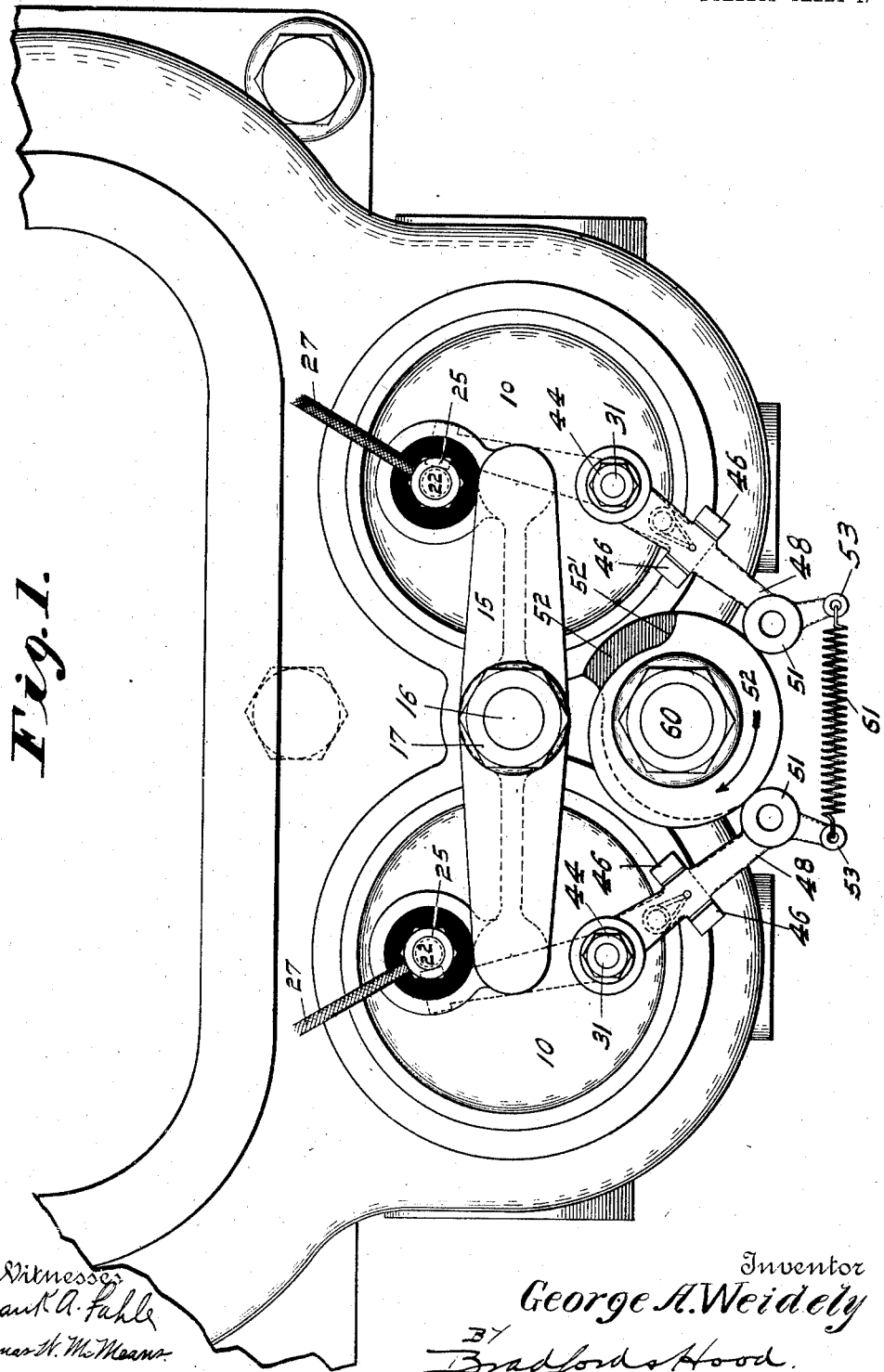

UNITED STATES PATENT OFFICE.

GEORGE A. WEIDELY, OF INDIANAPOLIS, INDIANA, ASSIGNOR OF ONE-HALF TO HAROLD O. SMITH, OF INDIANAPOLIS, INDIANA.

SPARKER.

No. 928,484.      Specification of Letters Patent.      Patented July 20, 1909.

Application filed January 2, 1908. Serial No. 409,037.

*To all whom it may concern:*

Be it known that I, GEORGE A. WEIDELY, a citizen of the United States, residing at Indianapolis, in the county of Marion and State of Indiana, have invented certain new and useful Improvements in Sparkers, of which the following is a specification.

The object of my invention is to produce an improved sparking mechanism for internal combustion engines, the structure being so designed as to produce a sudden and positive separation of the sparking terminals as well as compensating for any wear, and also being such as to permit ready removal for inspection.

The accompanying drawings illustrate my invention:

Figure 1 is a plan of a pair of my improved spark plugs; Fig. 2 an axial section; Fig. 3 a detail section of the arm, and Fig. 4 a plan of said arm together with the coöperating stationary terminal and an operating cam.

In the drawings, 10 indicates the main body of the plug, said body being circular in cross section and provided at its inner end with an ensmalled portion 11 so as to form a tapered shoulder 12 adapted to rest upon a correspondingly formed shoulder 13 in the opening leading to the combustion chamber 14 in the engine, so that, when a plug is slipped into place and its shoulder 12 held tightly upon shoulder 13, a gas-tight union will be formed. The plug 10 is held in position by means of an arm or bar 15 slipped over a threaded stud 16 and held down tightly by means of a nut 17. Where an engine is provided with a pair of adjacent cylinders, as in the form shown in the drawings, this arrangement is exceedingly convenient because the arm 15 may be so proportioned as to engage the two plugs 10 and hold them both in place. If, for any reason, inspection of the inner end of the plug is desired, it is a very simple matter to remove nut 17, whereupon arm 15 may be withdrawn and the plug 10 readily picked out without the need of a special tool or a large wrench.

Formed through plug 10 is an opening 20 which is tapered outwardly at both ends in order to receive tapered insulating bushings 21, 21 which are bored to receive the main body or shank 22 of the stationary spark plug 23. Shank 22 is provided at its inner end with a flange 24 adapted to engage the inner bushing 21 and the outer end of the shank 22 is threaded and provided with a pair of nuts 25 and a washer 26, the arrangement being such that one wire 27 of the sparking circuit may be readily attached to the shank 22 and, by tightening nuts 25, the two bushings 21, 21 may be simultaneously forced into the oppositely tapered ends of the opening 20 and thus form a gas-tight mounting for the stationary plug 21. Plug 10 is also provided with a bore 30 in which is journaled the spindle 31 of a swinging terminal 32 which, at its end, is provided with a face adapted to contact with a face carried by the stationary terminal 23. In order to form a gas-tight joint, I provide spindle 31 at its inner end with a tapered shoulder 35 adapted to seat in a correspondingly formed seat 36 formed at the inner end of bore 30, and the shoulder 35 is held snugly in place in its seat by means of a spring 37.

In order to form a support for the spring I provide head 10 with the tubular boss 40. Near its outer end spindle 31 is tapered at 41 and mounted on its tapered portion is a correspondingly bored hub 42 of an arm 43, and a nut 44 on the threaded end 45 of spindle 31 serves to clamp said hub in any desired angular position on spindle 31. Arm 43 is provided with a pair of separated fingers or abutments 46 46 between which projects an arm 48 which is somewhat narrower than the distance between the fingers and is journaled at its inner end upon hub 42. A light spring 50 is introduced between these two arms to normally hold arm 48 against one of the fingers 46. Arm 48 is provided with a head 51 adapted to be engaged by an operating cam 52, and in order to use the structure in the two-cylinder construction, (such as that shown in Figs. 1 and 2), without the necessity of making "rights" and "lefts," while at the same time making the engagement of the two arms with separate cams, as shown in Fig. 2, I make the arm 48 symmetrical with relation to its hub 48', but offset the head 51 to one side of the general line of arm 48 and at the outer end of said arm provide an eye 53 which is in the general line of the arm, as shown in Figs. 2 and 3. By this arrangement it will be seen that the arm 48 of the front spindle 31 (Fig. 2) can be arranged so that its head 51 will lie below the general plane of the arm, while the arm 48 on the rear spindle 31 (the left hand one in Fig. 1) can be reversed so that its head 51 will lie above the general plane of its arm. The two heads 51 will therefore lie in different planes and be in position to engage different cams 52, 52 both of the cams being carried by the single cam shaft 60. The eyes 53, however, will both lie in the same plane, and consequently may be connected by a spring 61 which operates upon both arms to swing them, when released at different times by their cams, so as to withdrawn the contact faces 33 from the corresponding stationary contact faces 34.

The operation is as follows: Heads 51 are brought into engagement with their corresponding cams 52 by the spring 61, and each arm 43 is secured upon its spindle 31 in such position that when its head 51 is in engagement with the largest portion of its cam, the contact face 33 of its arm 32 will be in engagement with the coöperating stationary contact face 34, and spring 50 will be compressed to about its full extent so that arm 48 will be in engagement with that finger 46 which lies back of the spring 50.

Referring now to the right hand end of Fig. 1, it will be seen that, as the engine operates and the cam shaft rotates, shoulder 52′ of the cam 52 will be drawn past head 51 of arm 48, and this arm during its first movement will move independently of the arm 32, and consequently, when it engages finger 46 of arm 43, it will deliver a blow to said arm which will serve to suddenly and sharply withdraw the contact face 33 from contact face 34, and thus insure a brillant and "fat" spark. As the contact faces 33 and 34 wear and as the cam 52 and head 51 wear, any tendency to slackness will be compensated by the spring 50 although this wear should not be permitted to amount to enough to take up the entire slack between the arm 48 and the forward finger 46 of its arm 43, for if this takes place the arm 48 is no longer capable of delivering the desirable separating blow to the swinging contact arm 32.

Having thus fully described my said invention, what I claim as new, and desire to secure by Letters Patent, is:—

In a sparker, a swinging terminal, a coöperating terminal, a rock shaft carrying said swinging terminal and having a threaded outer end flanked by a tapered portion, an arm sleeved on the said tapered portion and fitting the same, a nut for clamping said arm in any desired angular position on said tapered portion, a second arm sleeved upon the first mentioned arm, an abutment carried by one of said arms and adapted to engage the other arm, and a spring arranged between said arms, for the purpose set forth.

In witness whereof, I have hereunto set my hand and seal at Indianapolis, Indiana, this thirtieth day of December, A. D. one thousand nine hundred and seven.

GEORGE A. WEIDELY. [L. S.]

Witnesses:
 HAROLD O. SMITH,
 ARTHUR M. HOOD.